(12) United States Patent
Pautsch et al.

(10) Patent No.: US 8,115,655 B2
(45) Date of Patent: Feb. 14, 2012

(54) METHOD AND SYSTEM FOR MONITORING OF THE TEMPERATURE OF THE SURFACE OF AN AIRCRAFT

(75) Inventors: Christian Pautsch, Hamburg (DE); Wolfgang Wohlers, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 405 days.

(21) Appl. No.: 12/340,151

(22) Filed: Dec. 19, 2008

(65) Prior Publication Data

US 2009/0212976 A1 Aug. 27, 2009

Related U.S. Application Data

(60) Provisional application No. 61/014,815, filed on Dec. 19, 2007.

(30) Foreign Application Priority Data

Dec. 19, 2007 (DE) .......................... 10 2007 061 088

(51) Int. Cl.
 *G08B 21/00* (2006.01)
(52) U.S. Cl. ........ 340/945; 340/959; 340/962; 340/963; 340/964; 340/971
(58) Field of Classification Search ................. 340/959, 340/962, 963, 964, 971, 945
See application file for complete search history.

(56) References Cited

U.S. PATENT DOCUMENTS

| | | | | |
|---|---|---|---|---|
| 3,652,981 A | * | 3/1972 | Campanella | 340/961 |
| 4,114,442 A | * | 9/1978 | Pratt | 374/113 |
| 4,406,550 A | * | 9/1983 | Gray | 374/110 |
| 4,816,828 A | * | 3/1989 | Feher | 340/945 |
| 4,870,412 A | * | 9/1989 | Vuichard | 340/946 |

(Continued)

FOREIGN PATENT DOCUMENTS

DE 10 2006 03109 A1 1/2008

(Continued)

OTHER PUBLICATIONS

German Office Action in counterpart application De 10 2007 061 088.4 (with partial English-language translation).

(Continued)

*Primary Examiner* — George Bugg
*Assistant Examiner* — Paul Obiniyi
(74) *Attorney, Agent, or Firm* — Greenblum & Bernstein, P.L.C.

(57) ABSTRACT

The invention relates to a method and a system for monitoring the temperature of an aircraft, in which at least one camera connected to a first processing unit, for imaging detection of at least one region of the substantially upwardly-pointing outer surface of the aircraft, detects an images once, several times, or at regular intervals and transmits this to the first processing unit, wherein the light spectrum which may be detected by the camera lies substantially in the infrared range and the first processing unit determines the temperatures of substantially all the pictorially detected locations or has these determined by a downstream signal-processing device, in each case compares the temperature for individual locations with a predetermined maximum design temperature for the relevant location, and if the maximum design temperature is exceeded, generates a warning signal. The warning signal may be used to prevent takeoff of the aircraft, wherein the determined exceeding of the temperature may be checked by checking the measurements by means of a thermographic image of the surface of the aircraft in the cockpit of the aircraft and the prevention of takeoff may be deactivated if necessary.

23 Claims, 3 Drawing Sheets

U.S. PATENT DOCUMENTS

| | | | | |
|---|---|---|---|---|
| 5,138,459 | A * | 8/1992 | Roberts et al. | 348/231.6 |
| 5,225,875 | A * | 7/1993 | Shapiro et al. | 345/690 |
| 5,375,794 | A * | 12/1994 | Bleeg | 244/76 C |
| 6,002,450 | A * | 12/1999 | Darbee et al. | 348/734 |
| 6,264,135 | B1 * | 7/2001 | Dacosta | 244/1 R |
| 6,405,975 | B1 * | 6/2002 | Sankrithi et al. | 244/1 R |
| 6,542,076 | B1 * | 4/2003 | Joao | 340/539.14 |
| 6,982,412 | B2 * | 1/2006 | Watson et al. | 250/252.1 |
| 7,027,719 | B1 * | 4/2006 | Schneider et al. | 386/224 |
| 7,248,201 | B2 * | 7/2007 | Buccinna et al. | 341/176 |
| 7,499,737 | B2 * | 3/2009 | Mizuta et al. | 455/575.3 |
| 7,549,750 | B2 * | 6/2009 | Nakamura et al. | 351/237 |
| 7,729,013 | B2 * | 6/2010 | Nishida | 358/2.1 |
| 7,826,827 | B2 * | 11/2010 | Hull et al. | 455/412.2 |
| 2001/0053708 | A1 * | 12/2001 | Sugiyama et al. | 455/566 |
| 2002/0080141 | A1 * | 6/2002 | Imai et al. | 345/519 |
| 2002/0091952 | A1 * | 7/2002 | Lin et al. | 713/300 |
| 2002/0099479 | A1 * | 7/2002 | Chatrenet et al. | 701/15 |
| 2003/0002735 | A1 * | 1/2003 | Yamamoto et al. | 382/167 |
| 2003/0129964 | A1 * | 7/2003 | Kohinata et al. | 455/411 |
| 2003/0141987 | A1 * | 7/2003 | Hayes | 340/825.72 |
| 2003/0154482 | A1 * | 8/2003 | Tsukamoto et al. | 725/53 |
| 2003/0189509 | A1 * | 10/2003 | Hayes et al. | 341/176 |
| 2004/0125074 | A1 * | 7/2004 | Lin | 345/156 |
| 2005/0160451 | A1 * | 7/2005 | Batra et al. | 725/37 |
| 2006/0032547 | A1 * | 2/2006 | Rossi | 141/94 |
| 2006/0050238 | A1 * | 3/2006 | Nakamura et al. | 351/205 |
| 2006/0158324 | A1 * | 7/2006 | Kramer | 340/447 |
| 2006/0202881 | A1 * | 9/2006 | Buccinna et al. | 341/176 |
| 2006/0220806 | A1 * | 10/2006 | Nguyen | 340/426.36 |
| 2007/0015548 | A1 * | 1/2007 | Flick | 455/569.2 |
| 2007/0042765 | A1 * | 2/2007 | Bailin et al. | 455/419 |
| 2007/0064279 | A1 * | 3/2007 | Nishida | 358/462 |
| 2007/0201050 | A1 * | 8/2007 | Mochizuki et al. | 358/1.1 |
| 2008/0208399 | A1 * | 8/2008 | Pham | 701/4 |
| 2008/0228331 | A1 * | 9/2008 | McNerney et al. | 701/3 |
| 2008/0234878 | A1 * | 9/2008 | Joao | 701/2 |
| 2009/0093283 | A1 * | 4/2009 | Mizuta et al. | 455/575.3 |
| 2009/0294671 | A1 * | 12/2009 | Baghai | 250/338.1 |
| 2009/0309762 | A1 | 12/2009 | Wölcken et al. | |
| 2009/0319179 | A1 * | 12/2009 | Mino | 701/207 |
| 2009/0321576 | A1 * | 12/2009 | Shah et al. | 244/134 F |
| 2011/0028190 | A1 * | 2/2011 | Mizuta et al. | 455/575.3 |

FOREIGN PATENT DOCUMENTS

| | | | |
|---|---|---|---|
| JP | 2006122576 A | * | 5/2006 |
| KR | 2004107066 A | * | 12/2004 |
| WO | WO 93/01 977 A1 | | 2/1993 |
| WO | WO 03077539 A1 | * | 9/2003 |

OTHER PUBLICATIONS

German Office Action in counterpart application De 10 2008 063 973.7 (with partial English-language translation).

* cited by examiner

METHOD AND SYSTEM FOR MONITORING OF THE TEMPERATURE OF THE SURFACE OF AN AIRCRAFT

CROSS-REFERENCE TO RELATED APPLICATIONS

The present application is a non-provisional of U.S. Provisional Application 61/014,815 filed Dec. 19, 2007, and claims priority under 35 U.S.C. §119 of German Patent Application No. DE 10 2007 061 088.4 filed Dec. 19, 2007. Moreover, the disclosures of the U.S. Provisional Application and of the German priority document are expressly incorporated by reference herein in their entireties.

BACKGROUND OF THE INVENTION

1. Field of the Invention

The invention relates to a method and a system for monitoring of the temperature of the surface or the outer skin of an aircraft due to heat radiation.

2. Discussion of Background Information

Such methods are already known in the prior art and serve to determine the surface temperature of an aircraft located in particular on the ground, in order to ensure that a maximum operating temperature specified when designing the aircraft is not exceeded.

In a commonly used method, the maximum occurring operating temperature is determined when designing the aircraft by way of calculations, measurements, and statistical evaluation. It is thereby ensured with a high probability that the aircraft does not actually exceed this operating temperature in reality. However, this method includes the usual statistical uncertainties, due to which either the temperature to be assumed is too high (with the ensuing conservative design) or on the contrary, the probability of real temperatures occurring, which exceed the specified operating temperature, is too high. The statistical basis for the determination of the temperatures depends, inter alia, on wind and solar intensity data. These are dependent on the geographical location of the possible airports, which can control the aircraft. If, after designing the aircraft and determining the maximum operating temperature, a new airport becomes available which would give rise to higher operating temperatures, there would be the risk that this should have been taken into account when designing the aircraft. Such imponderables can only be reliably avoided by very high assumed maximum operating temperatures, which, however, leads to forfeiture of an optimum design for the aircraft.

It is further known, in one modification of the method, to take into account the influence of the selected aircraft paints. By restricting the shades and/or by using special thermal-radiation-reflecting paints (also called "solar heat reflectant paints"), the maximum temperature to be taken into account can be reduced to an acceptable level. However, the restriction of the paint both in shade and in paint material constitutes an undesirable hindrance for the aircraft operator. Furthermore, when applying such a method, it is difficult to check whether the relevant aircraft stay painted with the correct paints throughout their entire operating life. The availability of the paints may be cited as a further disadvantage since the allowed paints may well no longer be available after a few years. As a last aspect, the temporal stability of the paints is also questionable. It is uncertain whether after some time, a solar heat reflectant paint still reflects solar radiation just as effectively as immediately after it was originally applied to the aircraft. For these reasons, it ultimately follows that this method is certainly applicable but does not appear to be particularly attractive and is beset with a number of uncertainties.

Another method pursues a different approach and uses fixedly installed temperature sensors to measure temperatures which actually occur at critical positions on the aircraft surface and prevents operation of the aircraft by corresponding displays in the cockpit which indicate that a specified maximum operating temperature of the aircraft is exceeded. The application of fixedly installed sensors has the disadvantage that changes in the color design could result in a change in the temperature distribution, so that possibly the fixedly installed sensors no longer detect the areas having the maximum temperature, so that their position needed to be changed. The latter would lead to appreciable expenditure since the internal lining and insulation of the aircraft would need to be partially removed to wire the sensors accordingly. Furthermore, in view of the adverse influence on the outside of the aircraft and the susceptibility of the sensors to breakdown, false alarms could result, which in turn cause loss of income for the operators. Alternatively, the use of a plurality of redundant sensors at one location or the use of very reliable sensors results in high costs.

Document WO 93/01 977 A1 describes a system for the visual determination of damages or incorrect operation which is externally observable on an airplane especially during flight. In this regard an infrared sensor is used for determination of radiation of a region of the outer airframe of the airplane. The system generates a pattern of pixels of the region and assigns a predetermined relevant parameter to each pixel of the same and compares this parameter with a value measured by the sensor. The system generates a warning signal for a display when the value which is measured for a pixel deviates from a value predetermined for this pixel.

Document U.S. Pat. No. 4,816,828 describes a system for visual determination of damages or incorrect operation which are externally observable on an airplane especially during flight.

Further, document DE 10 2006 031 09 A1 discloses a method for monitoring of the state of structural components in which an optical sensor in combination with a computer determines from subsequent images form the structural components to be monitored deviations between images and therefrom structural changes.

SUMMARY OF THE INVENTION

The invention provides a method and a system for monitoring the temperature of the outer skin or the surface of the airplane due to heat radiation with which the occurring temperature of the outer skin or the surface can be determined with little effort, reliably and precisely.

The problem is solved with the features of the independent claims. Further embodiments of the invention are described in the subclaims which are referring thereto.

According to the invention an extensive monitoring of the temperature of an aircraft is proposed with which the occurring surface temperatures of an aircraft can be determined permanently, reliably, and accurately. Furthermore, the determination of the temperature should not depend on the type of paintwork and the paints used and finally, should not be based on inaccurate statistical assumptions.

According to the invention a method for monitoring the temperature of the outer skin of an aircraft is provided, in which a camera connected to a first processing unit for imaging detection of at least one region of the outer surface of the aircraft, records an image once, several times, or at regular intervals and transmits this to the first processing unit, wherein the light spectrum which may be detected by the camera lies in the infrared range and the first processing unit determines the temperatures of pictorially detected locations or has these determined by a downstream signal-processing device. Further, the camera is disposed on the vertical stabilizer of the aircraft, the camera measures at least one area of the upwardly pointing outer surface of the airplane and the method is performed before the start of the airplane. The first processing unit compares the temperature for individual locations with a predetermined maximum design temperature for the relevant location, and, if the maximum design temperature is exceeded, generates a warning signal. Simultaneously the recorded image is displayed on a display device disposed in the cockpit of the aircraft, and the display device, the first or second processing unit, or another signal-processing device changes the colors of the recorded image displayed on the display device such that each temperature on the surface is allocated a different color.

According to a further example of the invention the determination of temperature values for predetermined locations of the surface area is defined by the following inputs before the determination of temperature values:

the number and the definition of the subarea of the region of the surface to be monitored and/or the numbers of locations or places of the subarea at which the temperature is to be determined and/or the arrangement of the locations or places of the subarea at which the temperature is to be determined and/or the sequence in which the subareas are monitored for determination of the temperatures of the complete surface to be monitored.

According to a further example of the invention the surface area measured by the camera is transmitted to the first processing unit by the camera as analogue colored image of the surroundings showing a perspective view of the surface. Alternatively, the region of the surface which is sensed by the camera is transmitted by the camera as a plurality of color values to the first processing unit which are assigned a set of two-dimensional image coordinates of the image made by the camera.

Accordingly, a method is provided for monitoring the temperature of an aircraft, in which a camera connected to a first processing unit, for imaging detection of at least one region of the substantially upwardly-pointing outer surface of the aircraft, detects an image once, several times, or at regular intervals and transmits this to the first processing unit. The light spectrum which may be detected by the camera lies substantially in the infrared range and the first processing unit determines the temperatures of substantially all the pictorially detected locations or has these determined by a downstream signal-processing device, in each case compares the temperature for individual locations with a predetermined maximum design temperature for the relevant location, and if the maximum design temperature is exceeded, generates a warning signal.

The advantages of the method according to the invention arise due to the combination of proven techniques and procedures to give a new safety device for aircraft. In principle, the current temperatures are determined, which do not depend on statistical quantities and/or new geographical operating locations. The real temperatures need not be increased from statistical considerations. Accordingly, no too-conservative assessment of the temperatures used for the design is made. At the same time, the freedom of the aircraft operator in respect of the color design of their aircraft is increased, since the color scheme and the paint material are no longer limited by temperature considerations. In each case, the infrared camera records the temperature on the basis of the actual state of the paintwork and thereby completely automatically takes into account the occurring aging effects of the paintwork.

Due to the imaging method for determining temperature, it is possible to simultaneously identify the maximum temperature at any point on the entire surface being viewed and is therefore not restricted to measured temperatures at selected measuring points.

In particular, the warning signal transmitted to an output device, which is connected to the first processing unit, a second processing unit, or another signal-processing device, results in the output of a visual or audible signal in the cockpit of the aircraft. Likewise, the automatic prevention of takeoff is feasible if a permissible maximum design temperature is exceeded at a pictorially recorded location on the aircraft surface.

At the same time, the recorded image may be displayed in a display device in the cockpit of the aircraft, wherein the image produced in gray levels is colored depending on brightness or intensity to allow a thermographic depiction of the surface temperatures. The displayed thermographic image allows the crew of the aircraft to check whether the maximum design temperature is exceeded and to deactivate incorrect warning signals, which would result in prevent of takeoff. For this reason, an excessive requirement for redundancy is restricted to one system executing the method according to the invention.

The invention is furthermore achieved by a system, which particularly is capable of executing the individual steps of the method according to the invention. The system comprises at least one camera, at least one processing unit, an output device, and a display device, and is defined by the equivalent claims.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
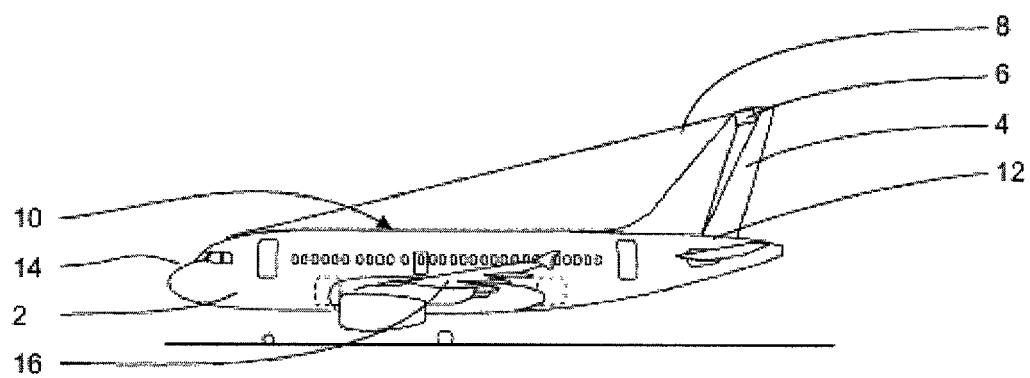
FIG. 1: shows a side view of an aircraft fitted for carrying out the method according to the invention.

FIG. 1 shows an aircraft 2, which is equipped with a camera 6 disposed in the tip of the vertical stabilizer 4. The camera 6 is set up so that it has a viewing range 8, which allows the fullest possible coverage of the surface 10 of the aircraft 2 to be measured. Preferably, the camera 6 can visually cover the entire surface 10 of the aircraft 2 or at least a large part thereof. The surface 10 preferably extends from the rearward part 12 of the fuselage of the aircraft 2, situated at the lower end of the vertical stabilizer 4, as far as the front part 14 and also comprises the wings 16. Nowadays, such a technique is occasionally used with cameras in the visible range to allow the pilot a better overview of the taxiway via a screen located in the cockpit. In the system according to the invention, however, the camera 6 preferably operates in the infrared range of the light spectrum, so that the temperatures of the surface 10 can be determined from the recorded image of the camera 6.

An infrared camera 6 provides an almost complete overview of any excessively high surface temperatures of the aircraft 2. This is brought about in particular due to the direct solar radiation acting on the surface 10. Therefore, only the upwardly pointing surface 10 on the upper side of the aircraft, which is visible from the tip of the vertical stabilizer 4, is relevant for all design-relevant and temperature-dependent mechanical loading cases.

The camera 6 is set up or controlled such that, in response to triggering signals from a processing unit or another signal-generating device, it creates an image of the surface 10 and transmits this image to a processing unit or another signal-processing device. Alternatively to this, the camera 6 can be set up so that it continuously records images of the surface 10 in a certain rhythm and may be switched on or off as required by a specified external signal.

It is furthermore feasible that in such an application, the camera 6 is calibrated by a regular reference measurement on the observed surface 10. To this end, the temperature is measured at some locations and the distribution in the camera image thereby recorded is calibrated. This ensures the most precise possible determination of temperature from the recorded infrared image. Alternatively or additionally, it would also be feasible to controllably heat a decided location to be measured for calibration.

Figure 2:
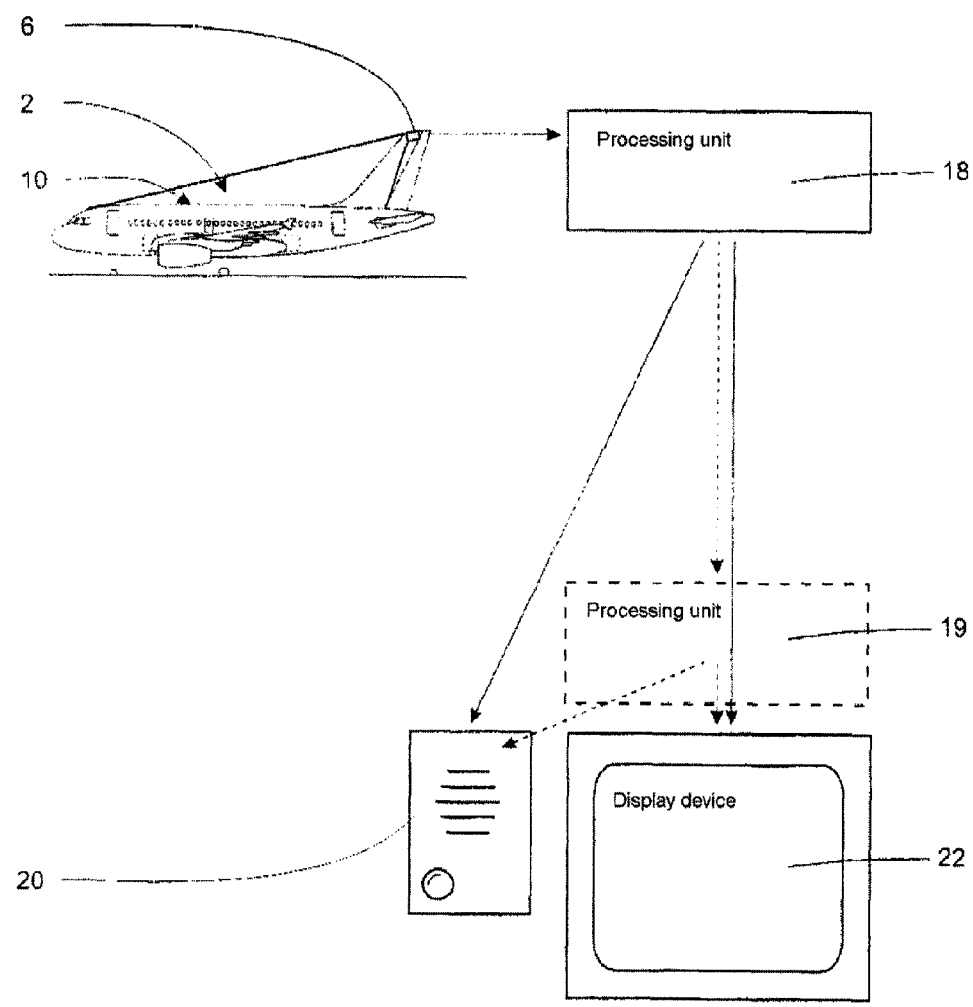
FIG. 2: shows a schematic view of the device according to the invention.

FIG. 2 shows the exemplary schematic structure of a system according to the invention. The camera 6 is connected to a first processing unit 18, which is intended for evaluating images which are recorded by the camera 6 from the surface 10 of the aircraft 2. The evaluation comprises, in particular, determining the temperature values of the recorded surface 10, at which the brightness of the irradiated infrared light at an image point allows the temperature of this image point to be determined.

In general, it is thereby possible to detect the entire temperature spectrum of the surface 10. The warmest locations on the surface can then be determined from the determined temperatures on the surface 10 by a suitable algorithm and compared with the reference values assigned to these locations. These reference values could possibly be the maximum possible surface temperature at which the design limit of the aircraft structure is reached. If it is found during the comparison that a surface temperature exceeds the relevant admissible design temperature, a warning signal is generated by the first processing unit 18, this signal is sent to a display device 20 located in the cockpit of the aircraft 2, and the pilot of the aircraft is informed visually and/or audibly about the situation that has occurred.

According to an embodiment of the invention the reception of the measured values is aligned with the coloring of the surface of the upper side of the airplane which faces upwards. Under surfaces which are "facing upward" or "pointing upwardly" in this context regions of the surfaces are to be understood of which the normal on the surface has a direction component in the vertical or direction of gravity when the airplane is standing on the ground. The upper side of the airplane can have a special coloring for this particular airplane. The method or system according to the invention takes into account that different coloring of airplanes of one type of airplanes can be provided for example in dependence of the operating company of the specific airplane. When using extremely light and at the same time preferably high-strength structures the thickness of the shell can be further optimized because the temperatures of the skin of the airplane resulting from the heating-up due to radiation before the start, i.e. on the ground, are monitored. Thereby, the start of the airplane the outer skin thereof having a temperature being too high is prevented, which temperature can lead to undulation or sectional bending when thin shells are used for the skin. Thereby smaller thicknesses of the shell can be provided particularly for the outer skin of the fuselage of the airplane when applying the method or systems according to the invention compared to not applying the method of monitoring according to the invention.

According to the invention a method of monitoring including a measurement and evaluation process is provided in which during a measurement process with regard to the surface to be monitored the camera 6 generates an image of the region of the surface which is sensed by the camera 6. In the process it can be provided that the image can be read out from the camera 6 or transmitted by the camera 6 to the first processing unit 18 as an analogue two-dimensional colored image of the surroundings with the region of the surface which is perspectively represented thereon or as a plurality of color values. The analogue two-dimensional colored image or the plurality of color values a set of two-dimensional image coordinates can be assigned.

From the image of the region of the surface, i.e. the colored image or the plurality of color values of the surface of the airplane which is to be monitored with regard to its temperature, the first processing unit 18 determines temperature values in an evaluation process or in an evaluation function which is implemented in the first processing unit 18. It can particularly be provided that the temperature values are generated in coordinates of the surface of the airplane. Thereby a transformation function of the evaluation function can particularly be provided which on the basis of a calibration provides a correlation between the image-related coordinates and the airplane-related coordinates or the coordinates which are related to the surface of the airplane. In this way, the temperature values can be displayed by the display device in optionally selectable representations and/or coordinate systems. Particularly, it can be provided that with a user interface which is functionally coupled to the first processing unit 18, the second processing unit 19 or a downstream signal-processing device the representation of the surface region to be monitored can be selected. In an alternative embodiment of the invention, the change of the representation or of the coordinate systems from image-related coordinates of the camera image to a functional level of the first processing unit 18, the second processing unit 19 or a downstream signal-processing device need not be applied.

According to an embodiment of the invention the function of the first processing unit 18 for determination of temperature values (step 32) for predetermined regions of the surface based on the image which is received from the first processing unit 18 can be designed such that the function can be designed such that this function can be configured or changed by inputs in reference to the way in which the temperature values are determined. In this regard, according to the invention the way of determination of temperature values can be selected or defined and influenced by the following commands or inputs:

the number and the definition of the subarea of the region of the surface to be monitored and/or the numbers of locations or places of the subarea at which the temperature is to be determined and/or the arrangement of the locations or places of the subarea at which the temperature is to be determined and/or the sequence in which the subareas are monitored for determination of the temperatures of the complete surface to be monitored.

The locations or places of the subarea at which the temperature is to be determined are those locations on the image for which the temperature is determined respectively. The arrangement of the locations or places of the subarea can be established by a regular raster. In a subarea the number of 50 to 200 measurement points per $m^2$ can be provided. For example, a first subarea of the surface to be monitored can be defined such that in this first subarea relatively dark colors of the surface coloring are provided and that a second subarea of the surface to be monitored can be defined such that in this second subarea relatively bright colors of the surface coloring are provided. The shape of the subareas can be defined in accordance with boundaries or the boundaries of a subarea with areas having predetermined brightness or darkness and/or on the basis of predetermined geometrical forms.

The definition or selection criterion can also comprise the criterion and the function of the first processing unit 18 for determination of temperature values can comprise the function according to which one or several subareas are weighted with regard to the sequence of the calculation of the temperature values so that the achievement of the critical temperature value of the surface is assumed after the determination of the temperatures for locations of a predetermined subarea or of a plurality of subareas.

The definition or selection of one or several criteria can be specifically provided for the respective airplane for which the method of temperature monitoring is performed. According to one example of the method or system according to the invention, the method or system can be designed such that at least one of these inputs or criteria are fed into or are implemented in the first processing unit 18, the second processing unit 19 or a downstream signal-processing device and are used by the evaluation function. Alternatively or additionally the method or system can be arranged such that at least one of these inputs or criteria are imported by an external equipment into the first processing unit 18, the second processing unit 19 or the downstream signal-processing device before the start of the execution of the evaluation step.

The external equipment can particularly be designed as mobile or portable input device and/or a flight preparation device or a flight preparation computer or also a maintenance computer by which among others the flight preparation data e.g. a predetermined flight path can be imported. The external equipment can also be designed such that the external equipment can be functionally coupled to a flight management system of the airplane in which also the above-mentioned inputs can be imported and/or from which the above-mentioned inputs are made available for the evaluation function.

The method and the system according to the invention therefore support the use of very light airframe structures and thus optimized shell thicknesses particularly for the outer skin of the fuselage of the airplane and allows to further optimize the same with reference to its reliability regarding the temperature and its form stability resulting therefrom. As the region the temperature of which is to be monitored has a relatively big size, the specific determination of the temperature of the surface by the camera 6 and a particular evaluation method is achieved in dependence of the coloring of the surface.

In this regard, according to an embodiment of the invention one or several inputs or criteria are fed into the temperature monitoring system and particularly into the first processing unit 18, which is functionally coupled to the camera 6, the second processing unit 19 or a downstream signal-processing device at the airplane.

By this particular definition of the measuring process and evaluation process for each subarea the measuring process can also be optimized particularly with regard to the speed of its performance and its accuracy. By providing a specific method for monitoring of the surface temperature or the measuring and evaluation process, respectively, which is specific for an airplane or an airplane coloring, particularly a reduction of the measuring effort and in accordance with the special conditions of the properties of the surface to be monitored can be achieved.

To simplify the system and save redundancies, the recorded camera image of the surface 10, optically prepared, could be displayed to the pilot on a display device 22. The optical preparation could possibly mean generating color information which replaces the gray levels of the original infrared image. Preparation of the recorded image is carried out, for example, by the first processing unit 18, a second processing unit 19, or another signal-processing device. Alternatively, the camera 6 is made capable of such preparation itself by means of integrated electronics.

Thus, possibly a cold color such as blue could be assigned to the image points of the camera image, which correspond to the coolest points on the surface 10. Conversely, a warm color such as red would be appropriate for those image points, which correspond to the highest temperature. The interposed image points could have a color which is selected from the color spectrum between blue and red depending on temperature. From an image prepared thermographically in this manner, on which temperature values could be superimposed in places, the pilots are able to check any alarm signal and possibly conclude from this that it appears to be incorrect. An incorrect alarm signal may possibly be triggered by a defective pixel in the camera 6, at which a false brightness value is generated, which would permanently lead to excessively high determined temperature values.

The output device 20 and the display device 22 need not necessarily be connected directly to the first processing unit 18 but could also be connected to the second processing unit. This is recommended, for example, when a data network, a bus system or the like is used to transport the image and/or temperature data from the camera 6 in the vertical stabilizer 4 far removed from the cockpit to the output device 20 and display device 22, the conversion, preparation, and reception of the corresponding data requiring a signal-processing device suitable for this purpose and/or a processing unit. Moreover, this configuration is preferred when signal-processing devices or processing units are fundamentally to be concentrated in the so-called avionics bay of the aircraft 2. The maintenance and repair of a processing unit 18 for evaluating infrared images, located in the vertical stabilizer 4 would result in increased maintenance expenditure.

Figure 3:
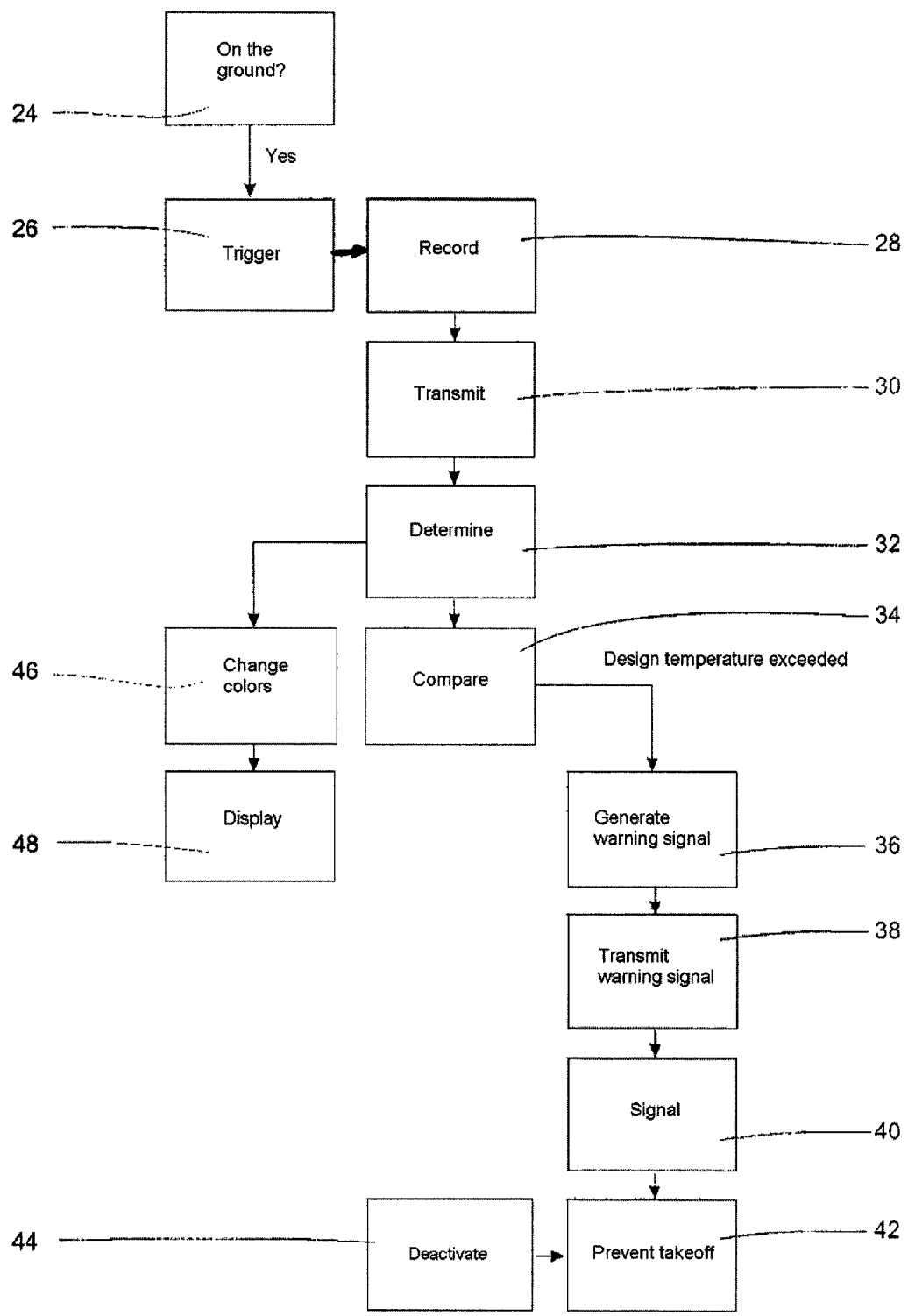
FIG. 3: shows a schematic view of the method according to the invention.

FIG. 3 finally illustrates the method according to the invention in a block diagram. In the method according to the invention, it is firstly checked whether the aircraft 2 is still located on the ground (step 24). If this is the case, triggering 26 of the image recording 28 is initiated. The recorded image is transmitted to the first and/or second processing unit or another signal-processing device, 30. From the transmitted image the temperatures are then determined immediately from the brightness or intensity values of the image, 32 and compared with the respective maximum design temperatures, 34. If the respective maximum design temperatures are exceeded, a warning signal is generated, 36 and transmitted to an output device 20 connected to the first processing unit, the second processing unit, or another signal-processing device, 38. The output device 20 signals the exceeding of the maximum design temperature visually or audibly (step 40) and by transmitting an error signal to the controller of the aircraft 2, triggers prevention of takeoff (step 42). If necessary, if a check of the temperature warning via the thermographic representation on the display device 22 indicates an incorrectly measured temperature, a crew member can deactivate the prevention of takeoff (step 44) by activating a corresponding input device.

At the same time as the comparison of the determined temperature, the image recorded by the camera 6 is modified in that the gray levels are replaced by colors depending on brightness (step 46) and the thus colored thermographic image is displayed on the display device 22 (step 48).

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for monitoring the temperature of the outer skin of an aircraft, in which a camera connected to a first processing unit for imaging detection of at least one region of the outer surface of the aircraft, records an image once, several times, or at regular intervals and transmits this to the first processing unit, wherein the light spectrum which may be detected by the camera lies in the infrared range and the first processing unit determines the temperatures of pictorially detected locations or has these determined by a downstream signal-processing device, characterized in
   that the camera is disposed on the vertical stabilizer of the aircraft,
   that the camera measures at least one area of the upwardly pointing outer surface of the airplane,
   that the method is performed before the start of the airplane,
   that the first processing unit compares the temperature for individual locations with a predetermined maximum design temperature for the relevant location, and, if the maximum design temperature is exceeded, generates a warning signal, wherein simultaneously the recorded image is displayed on a display device disposed in the cockpit of the aircraft, wherein the display device, the first or a second processing unit, or another signal-processing device changes the colors of the recorded image displayed on the display device such that each temperature on the surface is allocated a different color.

2. The method according to claim 1, characterized in that the surface area measured by the camera is transmitted to the first processing unit by the camera as analogue colored image of the surroundings showing a perspective view of the surface.

3. The method according to claim 1, characterized in that the region of the surface which is sensed by the camera is transmitted by the camera as a plurality of color values to the first processing unit which are assigned a set of two-dimensional image coordinates of the image made by the camera.

4. The method according to claim 1, characterized in that the determination of temperature values for predetermined locations of the surface area is defined by the following inputs before the determination of temperature values:
   the number and the definition of the subarea of the region of the surface to be monitored and/or
   the numbers of locations or places of the subarea at which the temperature is to be determined and/or
   the arrangement of the locations or places of the subarea at which the temperature is to be determined and/or
   the sequence in which the subareas are monitored for determination of the temperatures of the complete surface to be monitored.

5. The method according to claim 4, characterized in that the inputs are fed from an external equipment into the first processing unit, the second processing unit or a downstream signal-processing device for the definition of the determination of the temperature.

6. The method according to claim 1, characterized in that this camera is designed and controlled such that the camera generates the image of the surface caused by trigger signals from a processing unit or another signal generating component and that this image is transmitted by the camera to the first processing unit or the second processing unit.

7. The method according to claim 1, characterized in that the camera records images of the surface continuously in a predetermined rhythm and can be switched on or off from the outside.

8. The method according claim 1, characterized in that before the monitoring of the temperature of the airplane a calibration of the camera is performed on the basis of a reference measurement on the surface to be monitored in which the temperature at predetermined locations of the surface to be monitored is measured and the temperature according to the image recorded by the camera is calibrated with regard to the respective sensed temperature or the distribution of the temperature.

9. The method according to claim 8, characterized in that for the calibration a dedicated location to be sensed is heated in a controlled manner.

10. The method according to claim 1, characterized in that the warning signal for outputting a warning is transmitted to an output device connected to the first processing unit, a second processing unit, or another signal-processing device.

11. The method according to claim 1, characterized in that on receipt of the warning signal, the output device signals that the design temperature is exceeded by a sound output device and/or an optical signal output device in the cockpit of the aircraft.

12. The method according to claim 1, characterized in that the recording of the image is triggered by a signal of the first processing unit, the second processing unit, or another signal-generating device.

13. The method according to claim 1, characterized in that the imaging detection of the surface of the aircraft is only carried out when the aircraft is located on the ground.

14. The method according to claim 1, characterized in that the exceeding of the temperature prevents takeoff of the aircraft by generating an error signal and transmitting it to a controller of the aircraft.

15. The method according to claim 14, characterized in that the prevention of takeoff may be deactivated by a crew member by actuating an input mechanism.

16. A system for monitoring the temperature of the outer skin of an aircraft, comprising at least one camera for imaging detection of at least one region of the substantially upwardly-pointing outer surface of the aircraft, and a first processing unit, wherein the camera is connected to the first processing unit for transmitting recorded images, the light spectrum which may be detected by the camera lies in the infrared range, and the first processing unit is configured to determine the temperatures of substantially all the pictorially detected locations from the transmitted image or to have these determined by a downstream signal-processing device, characterized in that
   the camera is disposed on the vertical stabilizer of the aircraft,
   the first processing unit comprises a function, with which for each location the temperature is compared with a predetermined maximum design temperature for the relevant location, and if the maximum design temperature is exceeded, generates a warning signal,
   the display device is disposed in the cockpit of the aircraft,
   wherein that the display unit, and the first or a second processing unit or another signal-processing device are designed to change the colors of the recorded image displayed on the display device such that each temperature on the surface is allocated a different color.

17. The system according to claim 16, characterized in that the first processing unit is configured to transmit the warning signal for outputting a warning to an output device connected to the first processing unit, the second processing unit, or another signal-processing device.

18. The system according to claim 16, characterized in that the output device comprises a sound output device and/or an optical signal output device and is configured, on receipt of the warning signal, to trigger by the sound output device an acoustic signaling and/or by the optical signal output device, a visual signaling in the cockpit of the aircraft that the design temperature is exceeded.

19. The system according to claim 16, characterized in that the first or second processing unit or another signal-generating device triggers the recording of the image by the camera.

20. The system according to claim 19, characterized in that the imaging detection of the surface of the aircraft is only carries out when the aircraft is located on the ground.

21. The system according to claim 16, characterized in that in the event of the maximum design temperature being exceeded, prevents the aircraft from taking off by generating an error signal and transmitting this to a controller of the aircraft.

22. The system according to claim 21, characterized in that the system comprises an input mechanism which may be actuated by a crew member of the aircraft for disenabling the prevention of takeoff.

23. A method for monitoring the temperature of the outer skin of an aircraft using a camera disposed on a vertical stabilizer of the aircraft and arranged to measure at least one area of an upwardly pointing outer surface of the aircraft, comprising, prior to a starting of the aircraft:
   detecting an image of at least one region of the upwardly pointing outer surface of the aircraft with the camera connected to a first processing unit;
   recording an image once, several times, or at regular intervals;
   transmitting the recorded image to the first processing unit, wherein the light spectrum which may be detected by the camera lies in the infrared range;
   one of the first processing unit and a downstream signal-processing device determining the temperatures of pictorially detected locations; and
   the first processing unit comparing the temperature for individual locations with a predetermined maximum design temperature for the relevant location, and, if the maximum design temperature is exceeded, generating a warning signal, wherein simultaneously the recorded image is displayed on a display device disposed in the cockpit of the aircraft,
   wherein at least one of the display device, the first or a second processing unit or another signal-processing device is operable to change the colors of the recorded image displayed on the display device such that each temperature on the surface is allocated a different color.

* * * * *